United States Patent [19]  [11] 4,004,388
Stefanik  [45] Jan. 25, 1977

[54] WINDOW PANEL EDGE CONSTRUCTION
[75] Inventor: John E. Stefanik, Lower Burrell, Pa.
[73] Assignee: PPG Industries, Inc., Pittsburgh, Pa.
[22] Filed: Jan. 21, 1975
[21] Appl. No.: 542,749

Related U.S. Application Data
[62] Division of Ser. No. 444,440, Feb. 21, 1974.

[52] U.S. Cl. ............................ 52/398; 52/308;
 244/121; 428/251; 428/271; 52/624
[51] Int. Cl.² ...................... E04C 1/42; E04C 2/54
[58] Field of Search ............ 52/616, 398, 307, 308,
 52/208; 156/107, 109, 99, 108; 161/44, 45;
 219/203, 522; 428/38

[56] References Cited
UNITED STATES PATENTS

| | | | |
|---|---|---|---|
| 1,766,932 | 6/1930 | Novak et al. | 428/271 |
| 2,541,896 | 2/1951 | Vasileff et al. | 428/251 |
| 2,707,810 | 5/1955 | Bolte | 52/399 |
| 2,730,777 | 1/1956 | Koriagin | 52/208 |
| 2,808,355 | 10/1957 | Christie et al. | 52/208 |
| 2,939,186 | 6/1960 | Norwood et al. | 244/121 |

Primary Examiner—James L. Ridgill, Jr.
Attorney, Agent, or Firm—Edward I. Mates

[57] ABSTRACT

Window panels that have edge portions which are out of desired contour have straps of molded fiber glass reinforced thermosetting resinous material adhered to and overlapping both sides of the panels in marginal areas outside the viewing area and extending outwardly from the edges of the panels providing structural supporting members which are molded to conform to the desired panel edge contour for precise fit with frame members of the supporting structures. The straps for each unit are applied between its window panel and a frame member that conforms in shape to an aircraft mounting in an uncured state so that they conform to the respective shapes of the window panel and the frame member. While under heat and pressure during lamination, the straps cure to form rigid connecting members rigidly secured to the window panel, thus forming a rigid unitary structure whose outline shape conforms to that of the aircraft mounting.

13 Claims, 6 Drawing Figures

U.S. Patent     Jan. 25, 1977     Sheet 1 of 2     4,004,388
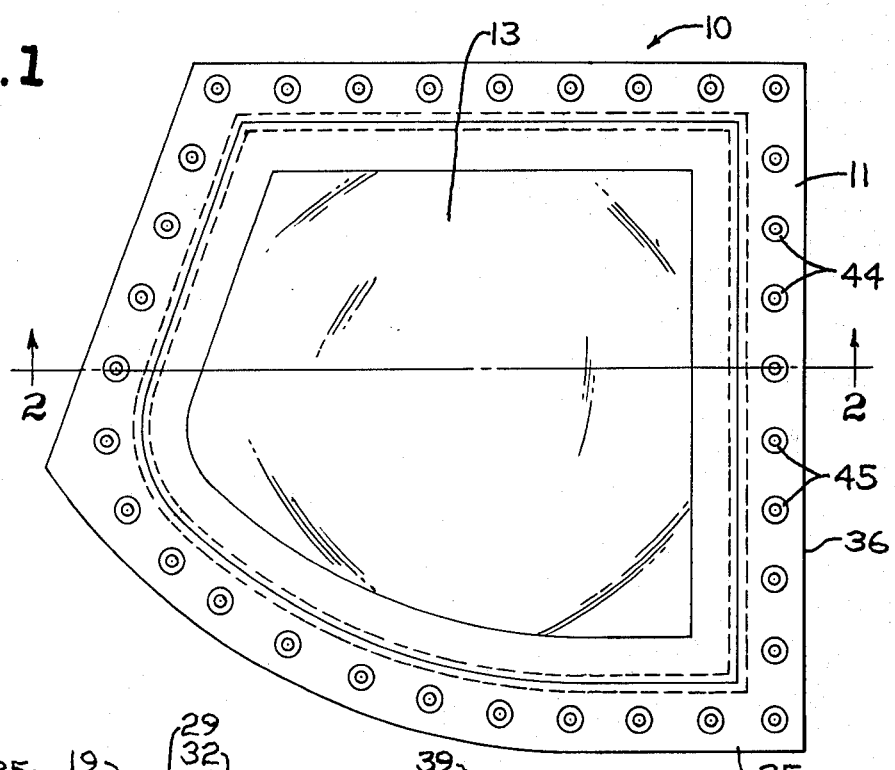
Fig. 1
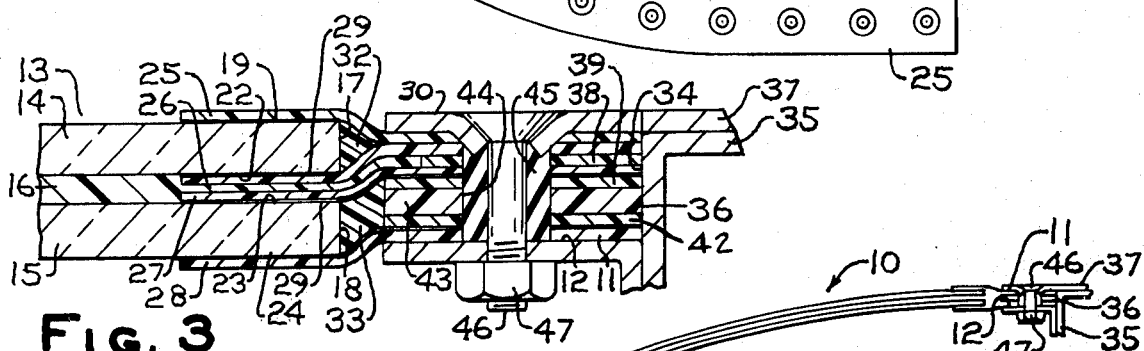
Fig. 3
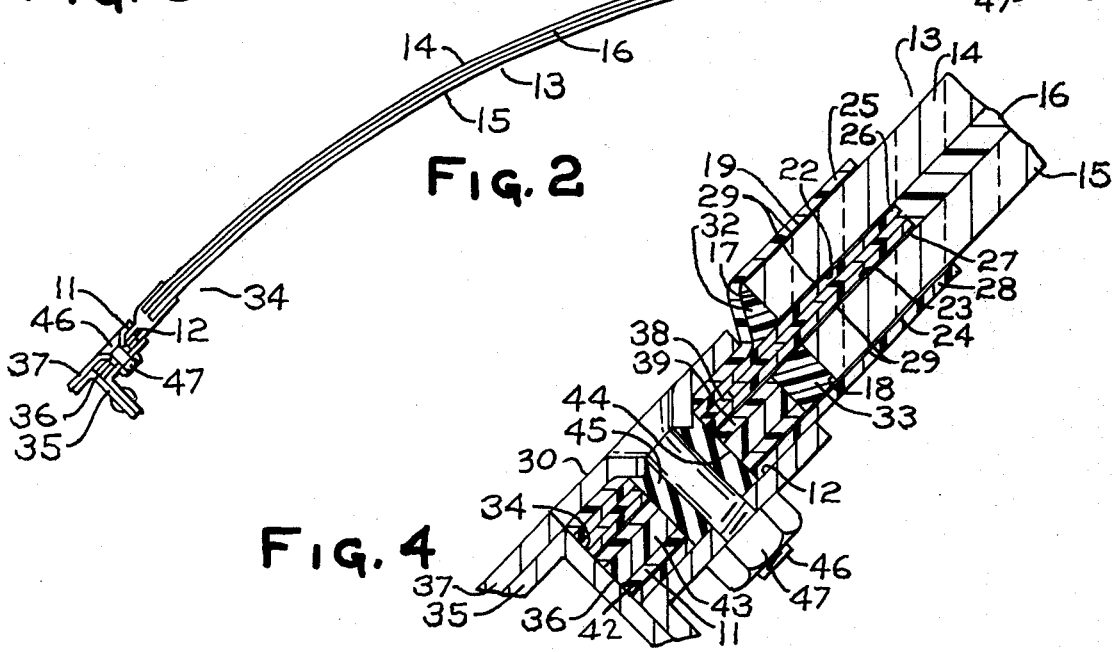
Fig. 2
Fig. 4

WINDOW PANEL EDGE CONSTRUCTION

This is a division of application Ser. No. 444,440, filed Feb. 21, 1974.

BACKGROUND OF THE INVENTION

This invention relates to window panels of the type used for aircraft windshields. In order to meet the service requirements of modern high speed aircraft, the window panels must withstand thermal and pressurization loads and provide clear undistorted vision to the pilot. Provision also is required for mounting of the window panels on the aircraft structure to evenly transfer the service loads from the panels to the structure. In many cases, it is desired to bend the panels into complex curved configurations to conform to the aircraft structure. It is very difficult to form the curved panels so that the peripheral edges precisely fit or match the contour of the mounting surfaces of the frame openings. This has resulted in residual stresses being imposed on the panels due to forced matching of the misfit panels to the mounting surfaces and/or has also required unmatched mounting and potting of the voids between the mounting surfaces and the panels. As a result, heavier panels of greater strength have been required because the ultimate strength of a panel is reduced by the residual stresses from forced matched mounting of the panels and/or because the glass will be unevenly stressed in tension loading in the case of unmatched mounting.

Window panels of the general type for which the present invention may be adapted are disclosed in U.S. Letters Pats. Nos. 3,356,833, 3,410,739, 3,424,642, 3,414,445, and 3,616,122, granted to Dee R. Orcutt. Although these patents show and describe window panels and methods for making the panels providing a superior product, they assume an exact shaping of the panels and a precise fit of the panel edges with a minimum provision for variability in fit between the panel edges and the mounting surfaces. As stated above, variability in fit may cause excessive strains on the transparent sheet where the fit is not precise. There may also be residual stresses developed in the transparent sheet by the forced attachment of the panel to the mounting surface. These problems are further compounded by the stress induced by temperature differentials to which the window panels are subjected which may range from −65° F. to +180° F. Also, the window panels must generally be adaptable for heating by suitable means such as a transparent electrical conductive coating or by fine resistance wires embedded in an interlayer of the panel. Such heating for deicing and defogging purposes may be a further source of imposing stress on the transparent panel.

SUMMARY OF THE INVENTION

According to this invention, a structural edge attachment member is interposed between the edge of the transparent sheet of the window panel and the mounting surface of the aircraft structure. This edge attachment member is bonded to the transparent sheet and extends outwardly away from the edge of the transparent sheet to form an outer portion providing an edge attachment which is precision molded to conform with the mounting surface. The edge attachment member is of a uncured material which is applied in the uncured state so that it can be attached directly to the edge of the transparent sheet and to the mounting surface without preshaping or preforming. Precise fit of the edge attachment minimizes residual stresses in the transparent sheet caused by a misfit and reduces costs by elimination of preformed or preshaped parts. With this construction, the edge attachment member is adhered to a transparent sheet in the marginal areas on both sides of the sheet by uncured strap members which extend outwardly from the edge of the sheet and are cured to become rigid and rigidly connected directly or bonded together through spacers extending around the transparent sheet. The invention may be applied to window panels having a single sheet or a laminated construction of two or more sheets.

To the accomplishment of the foregoing and related ends, the invention, then, comprises the features hereinafter fully described and particularly pointed out in the claims, the following description and annexed drawings setting forth in detail a certain illustrative embodiment of the invention, this being indicative, however, of but one of the various ways in which the principles of the invention may be employed.

BRIEF DESCRIPTION OF THE DRAWINGS

FIG. 1 is a schematic representation in plan view of a typical panel assembly.

FIG. 2 is a sectional view taken along the plane of line 2—2 of FIG. 1 illustrating the structural supporting member with the component parts bonded together in a unitary precision molded edge attachment.

FIG. 3 is an enlarged fragmentary sectional view of the edge attachment fastened to the supporting member at the right edge as shown in FIG. 2.

FIG. 4 is an enlarged fragmentary sectional view of the edge attachment fastened to the supporting member at the left edge as shown in FIG. 2.

DETAILED DESCRIPTION OF THE PREFERRED EMBODIMENT

Figure 5:
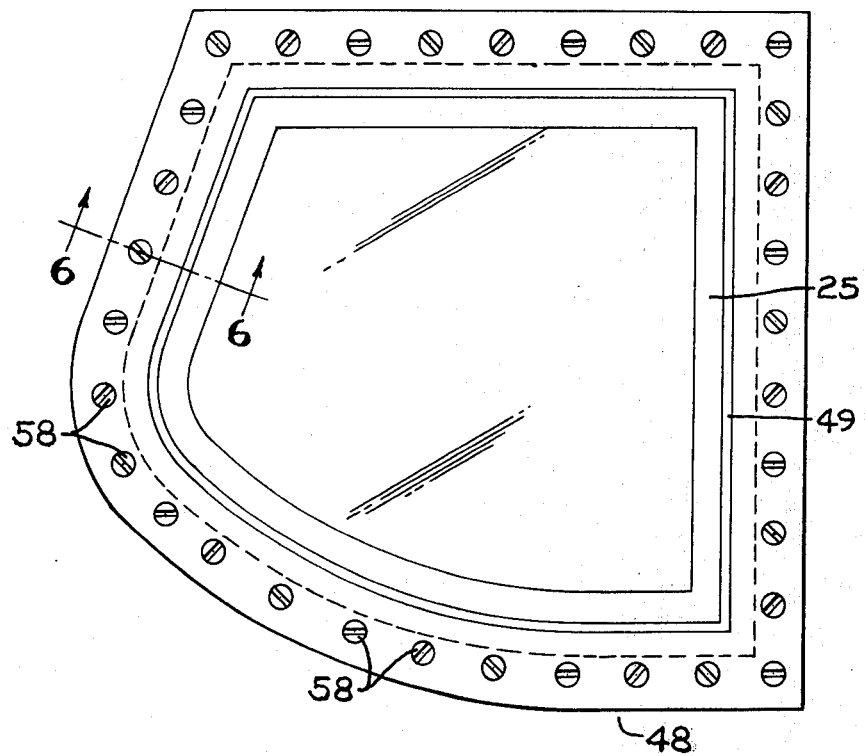
FIG. 5 is a schematic representation in plan view of the panel assembly in the molding-pressing frame.

Referring to FIG. 1, a window panel assembly such as windshield 10 for a high performance aircraft is shown. In order to conform to the curvatures of the aircraft fuselage, the windshield 10 has a complex curvature and is not only curved in the horizontal direction, as shown in FIG. 2, but is also curved in other directions. As a result, an edge attachment member 11 is provided extending around the windshield 10 for attachment to the supporting structure or aircraft windshield mounting surface 12, shown in FIGS. 2, 3 and 4.

The windshield 10 has a center portion 13 which is transparent and may be of a single sheet of glass or other rigid, transparent material such as acrylic or polycarbonate sheet, or of a laminated construction such as that shown in FIGS. 2, 3 and 4. The center portion 13, in FIGS. 1–4, has an outer sheet 14 and an inner sheet 15 of rigid transparent material such as semitempered glass separated by an interlayer 16 of transparent plastic material bonded to the glass surfaces of the outer sheet and inner sheet. The plastic of the interlayer 16 may be of any suitable material and is commonly a vinyl acetal derivative, preferably a polymerized vinyl butyral resin.

The outer sheet 14 and inner sheet 15 may have a thickness of approximately 0.187 inch and the interlayer 16 may have a thickness of approximately 0.120 inch. The outer sheet 14 has a peripheral edge 17 and the inner sheet 15 has a peripheral edge 18 which are located one over the other so that the outer sheet and inner sheet are coextensive. The interlayer 16 extends beyond the peripheral edges 17 and 18 into the edge attachment member 11, as shown in FIGS. 3 and 4, and in this embodiment the extension is approximately 0.375 inch beyond the edges.

The outer sheet 14 has an outer marginal area 19 and an inner marginal area 22 extending along the major surfaces of the sheet at the peripheral edge 17. The inner sheet 15 has an outer marginal area 23 and a inner marginal area 24 extending along the major surfaces of the sheet at the peripheral edge 18. The outer marginal area 19 and inner marginal area 22 of the outer sheet 14 are covered and bonded to a pair of strap members extending beyond the peripheral edge 17 into the edge attachment member 11. The pair of strap members includes an outer strap member 25 bonded to the outer marginal area 19 and an inner strap member 26 bonded to the inner marginal area 22. A second pair of strap members covers the marginal areas 23 and 24 of the inner sheet 15 and extends into the edge attachment member 11. The second pair of strap members includes a second outer strap member 27 bonded to the outer marginal area 23 of the inner sheet 15 and a second inner strap member 28 bonded to the inner marginal area 24 of the inner sheet. The strap members 25, 26, 27 and 28 are preferably of fiber glass impregnated with a thermosetting resin and may be of an impregnated woven fiber glass fabric, such as disclosed in the aforesaid Orcutt patents, the disclosures of which are incorporated herein by reference.

Epoxy resins are particularly well suited for use in accordance with this invention. These resins are conventional epoxy (diglycidyl ether of bisphenol A) and epoxy novolacs (glycidyl ethers of novalacs). Other types, which may be used, include cycloaliphatics based on diepoxide carboxylates or adipates, glycidyl ethers of various phenols of bisphenols, and resins based on cyclopentyl ethers. Conventional epoxy may also be blended with a solid polyfunctional resin (tetraglycidyl ether of tetraphenylethane).

The epoxy resins are used in a mixture of a base resin (or blend of resins) and a curing agent (or combination of curing agents and accelerators) generally referred to as the epoxy resin system. Some systems may also contain fillers or modifiers. Small amounts of fillers (approximately 2 to 3 percent) are added to some formulations to prevent excessive resin flow during cure. Modifiers are usually either polyamides or nitriles, and are added to adhesive-type systems to increase the flexibility of the cured resin. The epoxy resins are converted to a cured thermoset stage by chemical combination with curing agents or by the action of catalysts. The temperatures at which curing reactions occur depend primarily on specific curing agent or catalyst. Reactions may be initiated at ambient temperature or they may require the addition of heat. Nearly all resin formulations employ elevated temperature and pressure curing systems. For general purpose systems, cures are typically at about 250° F. to 350° F. with postcures at elevated temperatures, if required. Cure cycles are determined by the material being used. The variables to be considered include the concentration of curing agents, accelerators or catalysts.

Various curing agents for epoxy resins may be used such as aromatic amines, aliphatic primary amines, tertiary amines, amides, latent curing agents, and acid anhydrides.

Following is a list of pertinent properties of cast epoxy resins which may be used with this invention:

Tensile strength about 7.5 to 17.2 KSI; initial tensile modulus about 4.6 to 7.8 $\times$ 10$^5$ psi.

Compression strength about 18.6 to 32.9 KSI; initial compression modulus about 4.1 to 6.9 $\times$ 10$^5$ psi.

Flexural strength about 15.9 to 31.4 KSI; flexural modulus, about 4.3 to 7.9 $\times$ 10$^5$ psi.

The strap members 25, 26, 27 and 28 may be adhered to the inner sheet 15 and outer sheet 14 by a structural bonding material 29 of an adhesive composition such as modified phenolic, vinyl phenolic, nitrile phenolic, neoprene phenolic, epoxy phenolic, epoxy, modified epoxy, nitrile epoxy, nylon epoxy, polyamide epoxy or elastomeric silicone. Preferably, the structural bonding material 29 is in the form of a thin film having a thickness of around 0.008 to 0.015 inch.

An outer bumper strip 32 of flexible molded material is disposed along the peripheral edge 17 of the outer sheet 14 between the outer strap member 25 and inner strap member 26 of the outer sheet 14. The material of the outer bumper strip 32 may be a silicone elastomer such as silicone rubber. An inner bumper strip 33 may be a flexible molded material such as the vinyl butyral resin used for interlayer 16. The inner bumper strip 33 is disposed along the peripheral edge 18 of the inner sheet 15 and between the second outer strap member 27 and second inner strap member 28 of the inner sheet 15. A parting film of protective material such as "Teflon" may be applied to the peripheral edges 17 and 18 of the sheets 14 and 15 at the surfaces of the bumper strips 32 and 33 to avoid "cold chipping". The strap members 25, 26, 27 and 28 are in bonded engagement with the bumper strips 32 and 33.

The edge attachment member 11 extends outwardly from the peripheral edges 17 and 18 of the inner and outer sheets 15 and 14 a substantial distance to provide for mounting of the windshield 10 in an opeing 34 of the fuselage as defined by a structural edge flange 35, shown in FIGS. 2, 3 and 4. In the present embodiment, it is approximately two inches from a trim edge 36 of the edge attachment member 11 to the peripheral edges 17 and 18 of the inner and outer sheets 15 and 14. The thickness of the edge attachment member 11 is determined by the distance between the mounting surface 12 and the inner surface of a retainer ring 30 having an outer surface that is coplanar with skin sheet 37 on the aircraft. As shown in FIGS. 2, 3 and 4, this thickness which in the present embodiment is approximately 0.340 inch exceeds the combined thicknesses of the strap members 25, 26, 27 and 28 and therefore spacer strips 38, 39 and 42 and a spacer 43 are interposed between the strap members in bonded engagement therewith.

Spacer strip 38 is interposed between inner strap member 26 of the outer sheet 14 and the second outer strap member 27 of the inner sheet 15 and extends from the trim edge 36 of the edge attachment member 11 to the edge of the interlayer 16. Spacer strip 39 is in bonded engagement with the inner surface of the second outer strap member 27 and extends from the trim edge 36 to the inner bumper strip 33. Spacer strip 42 is in bonded engagement with the second inner strap member 28 and extends from the trim edge 36 to the inner bumper strip 33. The spacer strips 38, 39 and 42 may also be of fiber glass impregnated with a cured thermosetting resin of the type described hereinabove for the strap members 25, 26, 27 and 28.

In order to obtain additional thickness of the edge attachment member 11, a spacer member such as spacer 43 which in this embodiment has a thickness of approximately 0.125 inch is interposed and in bonded engagement with the spacer strips 39 and 42 and extends from the trim edge 36 to the inner bumper strip 33. The spacer 43 may be of a suitable material with proper expansion and physical properties, such as an asbestos type material impregnated with polyvinyl chloride or cured phenolic resin.

In order to mount the edge attachment member 11 on the mounting surface 12, holes 44 are provided at spaced-apart positions along the edge attachment member 11. Sleeves 45 of rubber or other resilient material may be disposed in the holes 44 in alignment with corresponding holes in the retainer ring 30 and mounting surface 12. Screws 46 are inserted through these holes 44 in threaded engagement with nuts 47.

Referring to FIGS. 2, 3 and 4, a typical installation of the windshield 10 is shown in which the laminated outer sheet 14, inner sheet 15 and interlayer 16 are formed to provide the generally desired contour but the marginal surface area 24 of the inner sheet 15 is not in coplanar alignment with mounting surface 12 completely around the periphery of the panel 10. This is evidenced by comparing the alignment of these surfaces in FIG. 4, which represents the ideal condition, with the lack of alignment of these surfaces in FIG. 3. Similar sections taken elsewhere about the periphery of the panel 10 will generally show similar variability in alignment. With the present construction, the edge attachment member 11 is attached directly to the outer and inner sheets 14 and 15 and precision molded to conform to the mounting surface.

Figure 6:
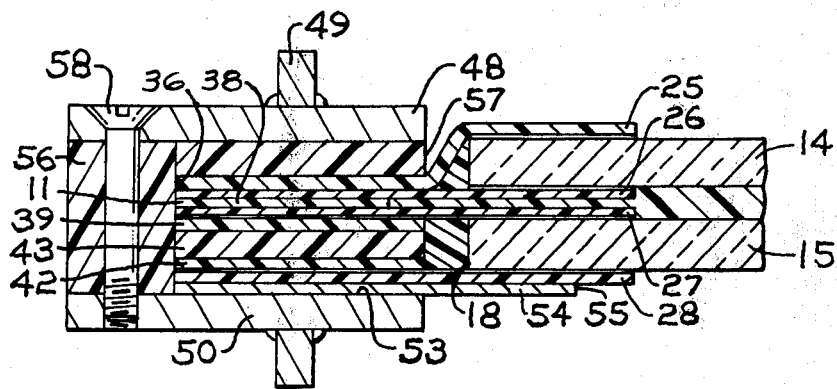
FIG. 6 is a sectional view taken along the plane of line 6—6 of FIG. 5 showing an edge of the panel assembly in the molding-pressing frame.

The strap members 25, 26, 27 and 28 and spacer strips 38, 39, 42 and spacer 43 are all formed in place about the edge of the outer sheet 14 and inner sheet 15 in the uncured condition. The configuration of the soft uncured strap members 25, 26, 27 and 28 and spacer strips 38, 39, 42 and spacer 43 may be determined irrespective of the position of the edges 17 and 18 of the outer sheet 14 and inner sheet 15. A molding-pressing frame 48 having the same mounting surface configuration as the aircraft frame and mounting surface 12 is used for precision placing of the edge attachment member 11. The requirement for the molding-pressing frame 48, shown in FIGS. 5 and 6, is proper contour for curved edge configuration and fit, rigidly to maintain proper contour, and closely matched thermal expansion to glass and edging materials in order to maintain proper edge contour after rigidizing the molded edge at elevated temperature cure conditions of 250° F. – 350° F. and subsequent cooling to room temperature. Rigidity in the molding-pressing frame 48 is provided by using metal T-frame members 49, 50 which may be welded from flat metal strips. The molding-pressing frame 48 can be made from metals that are matched in thermal expansion to glass and fiber glass laminate edge materials in the 4.5 – 6.5 microinches/inch/°F. thermal expansion coefficient range. Ferrous metals with chromium and/or nickel alloying metals can be used of which 430 stainless steel alloy is one type. The molding-pressing frame 48 can also be made from fiber reinforced plastic tooling materials with or without metal reinforcement that can be molded to the proper configuration and have the required rigidity and matched thermal expansion properties with glass and edging materials.

The T-frame member 50 has a surface 53 with the same contour as the supporting or mounting surface 12 on which the windshield 10 is to be installed. A deformable edge support or glass edge stabilizer 54 is mounted on the surface 53 and has a plurality of projecting edge portions 55 which provide required support for the glass sheets but which may be bent to conform to slight deviations in contour of the marginal surface areas 24 of the inner sheet 15. The contour of the upper and lower surfaces of support 54 otherwise conforms to the contour of surface 53.

Filler blocks 56 of a polyvinyl chloride-asbestos material are disposed between the T-frame members 49 and 50 and top spacer member 57 is adhered to the T-frame member 49 with the frame member and spacer member having a contour conforming with the contour of the surface 53 of the other T-frame member 50 for pressing the edge attachment member 11 therebetween. Screws 58 or clamps are spaced at positions along the molding-pressing frame 48 to apply pressure against the sides of the edge attachment 11.

The strap members 25, 26, 27 and 28 and spacer strips 38, 39, 42 and spacer 43 ar laid on the edge stabilizer 54 on T-frame member 50 in the soft condition with the trim edge 36 abutting the filler blocks 56. Of course, during the lay-up procedure the glass sheets and interlayer material are also set in place. The top spacer member 57 and T-frame member 49 are then placed on top the edge attachment 11 and T-frame member 49 pressed against the top spacer member and screws 58 threaded into the T-frame member 50 to hold the edge attachment in a compressed condition. The molding-pressing frame 48 and windshield 10 may then be placed in a bag of flexible impervious material which is sealed and a vacuum applied to the bag to press the outer surfaces of the bag against the windshield 10 and remove the gases which may be entrapped therein. The bag and contents may then be placed in an autoclave and heat and pressure applied to the windshield 10 to cure (that is, make rigid) the edge attachment member 11 in place, rigidly bonding the strap members 25, 26, 27 and 28 together and to the inner sheet 15 and outer sheet 14. This provides a precise fit of the strap members 25, 26, 27 and 28 to the outer sheet 14 and inner sheet 15 and to the molding-pressing frame 48. The resulting windshield 10 with the edge attachment member 11 will fit precisely on the mounting surface 12 of the aircraft.

As shown in FIGS. 3 and 4 the strap members 25, 26, 27 and 28 and the bumper strips 32 and 33 may not have the same configuration at all points around the windshield but can deviate sufficiently to provide the precise fit of the edge attachment member 11 to the mounting surface 12. This represents a savings in time and material in that windshields which previously would not fit the opening 34 of the aircraft now can be made to fit with the edge attachment member 11. Furthermore, the precise fit eliminates the residual stressing of the windshield 10 caused by clamping a misfit edge and forcing it into position on the mounting surface 12 which weakens the windshield for service reliability and performance.

Edge attachment tensile load tests were conducted on specimens using the construction described above.

An edge attachment tensile strength of an average of 1220 pounds per lineal inch of edge attachment was obtained, while imparting to the glass a tensile stress of about 12,500 psi, which is satisfactory for an aircraft application and even provides an increased safety factor. Dynamic tensile loading or fatigue tests were also performed on specimens of this construction with double shear mounting and pin loading. Specimens were tested at −65° F. temperature with 900 pounds per lineal inch tensile load at a rate of 12 cycles per minute. Two specimens completed 45,000 cycles without failure demonstrating the property of this edge attachment 11 to perform as a structural member.

An analysis of the full-size windshield performance when exposed to pressurization loads was accomplished using an actual airframe for the mounting. Strain gages were applied to the glass surfaces at critical areas to determine the stress geometry at an operating pressure of 5.2 psig, with a temperature gradient of −65° F. outside temperature and an inside temperature of ambient conditions. Maximum glass tensile stresses in the range of 5,000 – 8,000 psi were obtained which are below the ultimate levels obtained from the specimen testing. Semitempered glass generally exhibits a tensile strength of about 16,000 to 20,000 psi. The glass windshield 10 was also tested to an ultimate pressure of 14.8 psig without any deleterious effect.

In order to confirm the fail-safe performance of the windshield 10, the outer sheet 14 was broken and the panel pressure tested. This windshield 10 withstood the required operating pressure of 5.2 psig for a period of 15 minutes before the load was removed.

Although the present invention has been described with reference to the specific details of a certain embodiment thereof, it is not intended that such details shall be regarded as limitations upon the scope of the invention except insofar as included in the accompanying claims.

I claim:

1. A window panel assembly comprising a rigid transparent sheet for mounting in an opening on a supporting structure having a mounting surface including mounting surface portions of a given contour, said sheet having a peripheral edge and a peripheral marginal major surface area on each side of said sheet adjoining said edge, portions of said peripheral marginal major surface area on one side of said sheet being adapted to be mounted in substantially coplanar alignment with said mounting surface portions, a pair of rigid molded strap members composed of a reinforced, thermosetting resin that is cured during lamination of said assembly, one of said strap members being rigidly adhered to said marginal major surface area on said one side of said sheet and extending outwardly from said edge and the other of said strap members being rigidly adhered to said marginal major surface area on the other side of said sheet and extending outwardly from said edge and said strap members being connected outwardly of said edge of said sheet in a rigid structural edge attachment member having an outer portion molded to fit on said supporting structure around said opening whereby said sheet may be fastened through said strap members to said supporting structure to form a rigid assembly with a minimum of residual stress.

2. A window panel assembly according to claim 1 wherein said strap members are comprised of fiber glass impregnated with a thermosetting resin.

3. A window panel assembly according to claim 1 wherein a bumper strip of flexible molded material is disposed along said peripheral edge of said rigid transparent sheet between said strap members and bonded to said strap members.

4. A window panel assembly according to claim 1 wherein a spacer member is interposed between and bonded to said strap members outwardly of said edge of said sheet.

5. A window panel assembly according to claim 4 wherein spacer strips comprised of fiber glass impregnated with a cured thermosetting resin are disposed on both sides of said spacer member and abutting said strap members in bonded engagement therewith.

6. A window panel assembly according to claim 4 wherein said spacer member is composed of an asbestos type material impregnated with a composition selected from the group consisting of polyvinyl chloride and cured phenolic resin.

7. A window panel assembly according to claim 1 further comprising a rigid transparent second sheet, a plastic interlayer disposed between and bonded to said rigid transparent sheet and said rigid transparent second sheet, said second sheet having a peripheral edge and a marginal major surface area on each side of said second sheet adjoining said edge, a second pair of rigid moldable strap members composed of a reinforced, thermosetting resin that is cured during lamination of said assembly, one of said second pair of strap members being rigidly adhered to said marginal area on one side of said second sheet and extending outwardly from said edge of said second sheet and the other of said second pair of strap members being rigidly adhered to said marginal major surface area on the other side of said second sheet and extending outwardly from said edge of said second sheet and said second pair of strap members being connected outwardly of said edge of said second sheet to each other and to said strap members rigidly adhered to said rigid transparent sheet in a rigid structural edge attachment molded to fit on said supporting structure around said opening whereby said rigid transparent sheet and said second sheet may be fastened through said edge attachment member to said supporting structure with a minimum of residual stress.

8. A window panel assembly according to claim 7 wherein said plastic interlayer extends beyond the edges of said rigid transparent sheet and said second sheet into said edge attachment between said pair of strap members adhered to said rigid transparent sheet and said second pair of strap members adhered to said second sheet.

9. A window panel assembly according to claim 7 wherein said pair of strap members adhered to said rigid transparent sheet are separated by a spacer member and said second pair of strap members are bonded together in abutting relationship outwardly of said edge.

10. A window panel assembly according to claim 9 wherein said strap members are composed of fiber glass impregnated with a thermosetting resin.

11. A window panel assembly according to claim 9 wherein spacer strips of fiber glass impregnated with a thermosetting resin are laminated in said edge attachment, one of said spacer strips being disposed between said pair of strap members adhered to said rigid transparent sheet and said second pair of strap members and other of said spacer strips being interposed between said spacer member and the members of said second pair of strap members, in bonded engagement therewith.

12. A window panel assembly according to claim 9 wherein bumper strips of flexible, molded material are disposed along the edges of said rigid transparent sheet and said rigid transparent second sheet, said bumper strips being interposed between said pair of strap members adhered to said rigid transparent sheet and between said second pair of strap members in bonded engagement therewith.

13. A window panel assembly according to claim 8 wherein said spacer member is composed of an asbestos type material impregnated with a composition selected from the group consisting of polyvinyl chloride and cured phenolic resin.

* * * * *

UNITED STATES PATENT AND TRADEMARK OFFICE
CERTIFICATE OF CORRECTION

PATENT NO. : 4,004,388
DATED : January 25, 1977
INVENTOR(S) : John E. Stefanik

It is certified that error appears in the above-identified patent and that said Letters Patent are hereby corrected as shown below:

Column 4, line 42, "opeing" should be --opening--.

Column 6, line 27, "ar" should be --are--.

Column 10, claim 13, line 1, "8" should be --9--.

Signed and Sealed this

Twenty-sixth Day of April 1977

[SEAL]

Attest:

RUTH C. MASON
Attesting Officer

C. MARSHALL DANN
Commissioner of Patents and Trademarks